United States Patent
Heule

(10) Patent No.: US 6,551,036 B2
(45) Date of Patent: Apr. 22, 2003

(54) DRILLING BIT AND HOLDER FOR DRILLING BIT

(76) Inventor: Heinrich Heule, Kristallstrasse 6, CH-9434, Au (CH)

( * ) Notice: Subject to any disclaimer, the term of this patent is extended or adjusted under 35 U.S.C. 154(b) by 125 days.

(21) Appl. No.: 09/727,243

(22) Filed: Nov. 30, 2000

(65) Prior Publication Data

US 2002/0098050 A1 Jul. 25, 2002

(51) Int. Cl.[7] .............................................. B23B 51/02
(52) U.S. Cl. ........................ 408/227; 408/229; 408/713
(58) Field of Search ................................ 408/144, 227, 408/230, 231, 233, 713

(56) References Cited

U.S. PATENT DOCUMENTS

| | | | |
|---|---|---|---|
| 3,049,033 A | | 8/1962 | Benjamin et al. |
| 4,355,932 A | * | 10/1982 | Koppelmann et al. ...... 175/383 |
| 4,744,704 A | * | 5/1988 | Galvefors .................... 408/144 |
| 5,423,640 A | * | 6/1995 | Lindblom et al. ........... 408/227 |
| 5,474,407 A | * | 12/1995 | Rodel et al. ................. 408/227 |
| 5,599,145 A | * | 2/1997 | Reinauer et al. ............ 408/229 |
| 5,957,635 A | * | 9/1999 | Nuzzi et al. ................. 408/199 |
| 6,135,681 A | * | 10/2000 | Nuzzi et al. ................. 407/116 |
| 6,270,297 B1 | * | 8/2001 | Fang et al. .................. 407/116 |
| 6,371,702 B1 | * | 4/2002 | DeWald et al. ............. 408/227 |
| 2001/0031182 A1 | * | 10/2001 | Widin ......................... 408/230 |

FOREIGN PATENT DOCUMENTS

| | | | | |
|---|---|---|---|---|
| DE | 2422452 A1 | * | 11/1975 | ................. 408/227 |
| EP | 0 216 064 A1 | | 4/1987 | |
| JP | 40208 A | * | 3/1983 | ................. 408/230 |
| JP | 142117 A | * | 6/1991 | ................. 408/230 |

* cited by examiner

*Primary Examiner*—Daniel W. Howell
(74) *Attorney, Agent, or Firm*—Brown, Martin, Haller & McClain LLP

(57) ABSTRACT

This invention describes a drilling plate and bracket for the drilling plate for machining drilled holes in work pieces, whereby the bracket for the drilling plate is designed so that it is somewhat pin-shaped and holds the drilling plate on its front side. It is characterized in that the drilling plate (1) is designed with an enlarged sheet thickness in the area of the cutting geometry in which chip breaking contours (15, 16, 20) are formed.

18 Claims, 2 Drawing Sheets

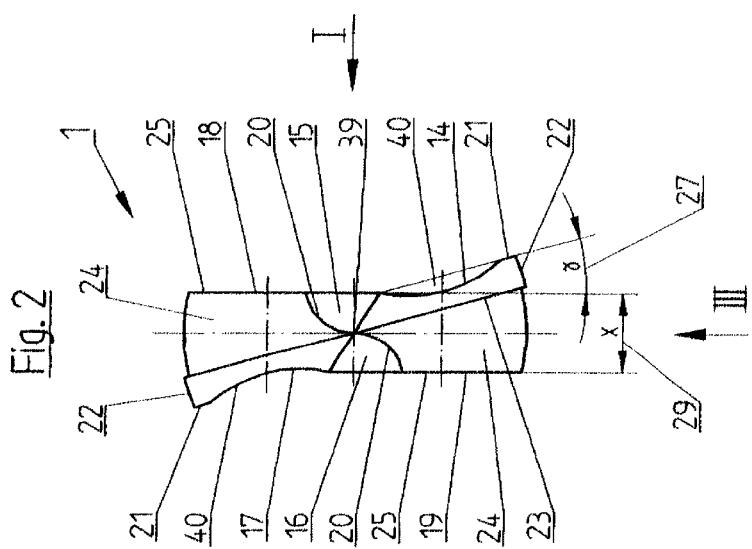
Fig.2
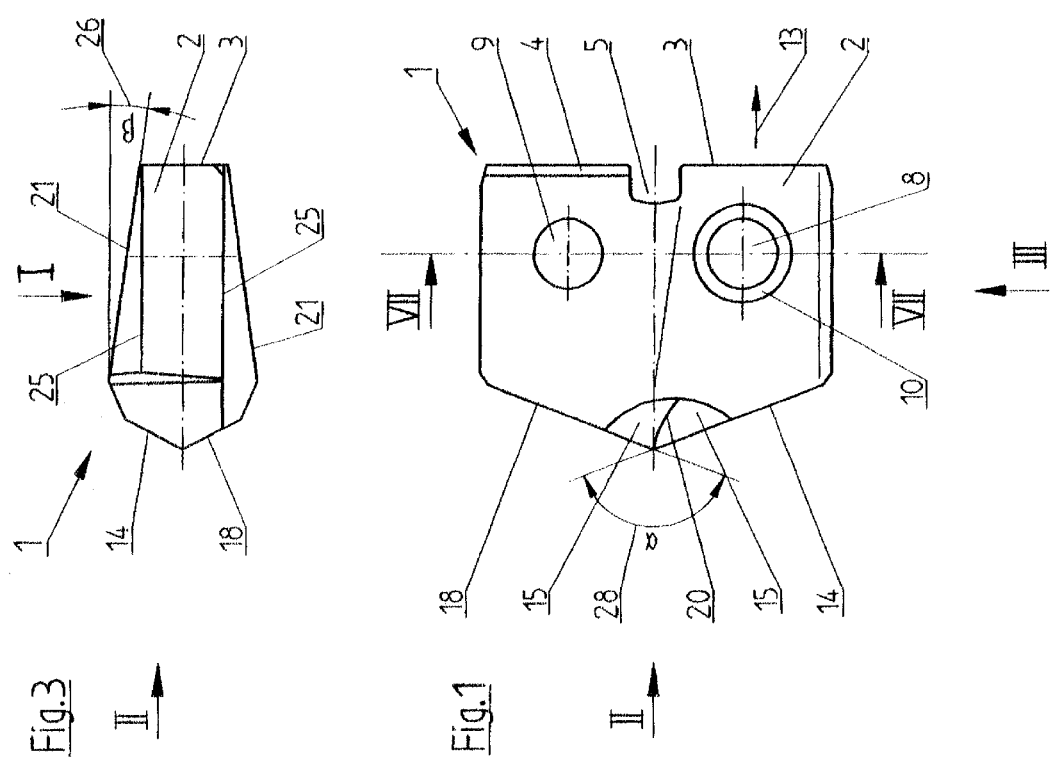
Fig.3
Fig.1

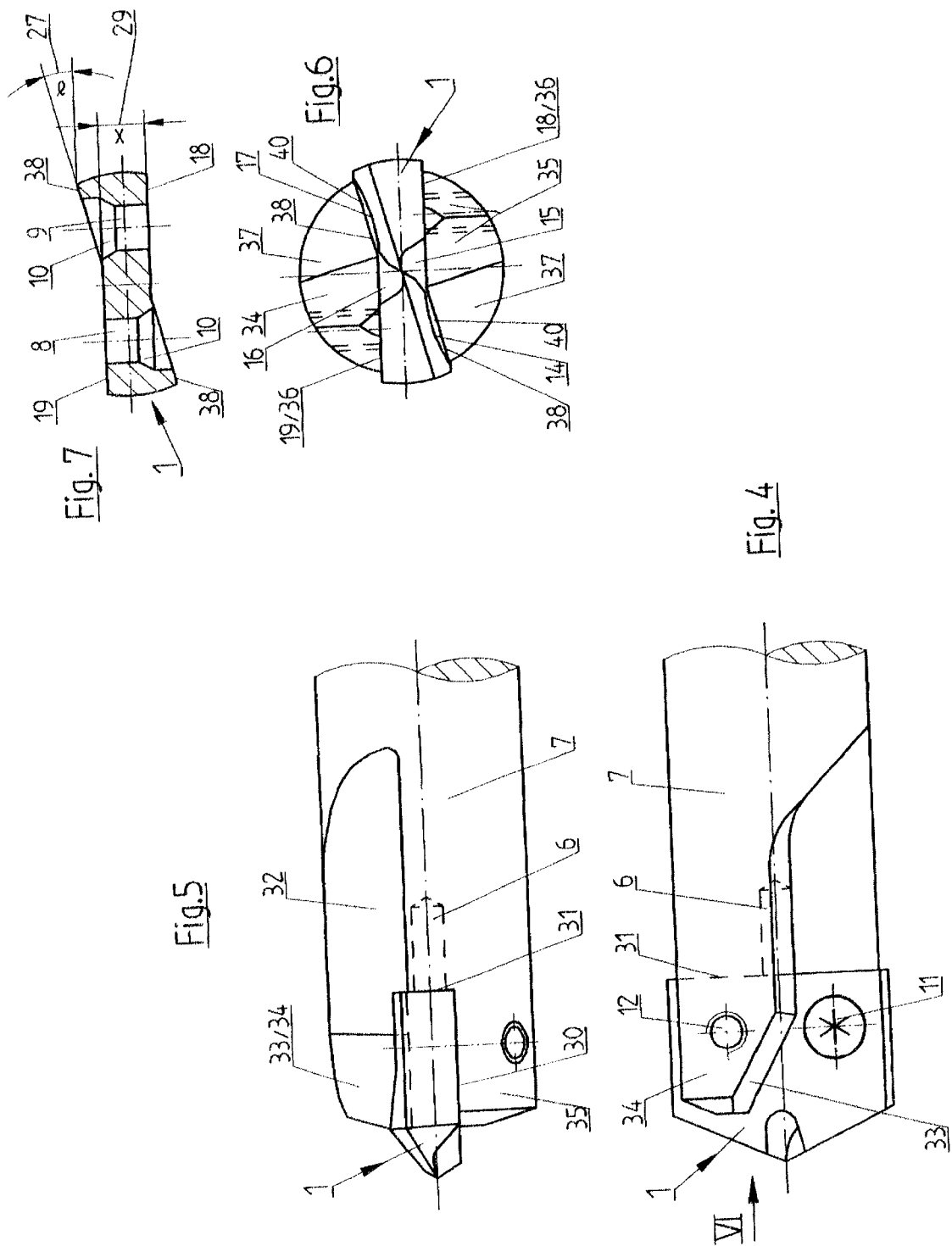

DRILLING BIT AND HOLDER FOR DRILLING BIT

BACKGROUND OF THE INVENTION

This invention relates generally to drilling tools having a holder and a cutting blade or bit mounted in the holder.

A drilling plate of this type has become known, for example as the object of DE 3204210C2. A similar technical instruction can also be found in EP 625 395 B1.

The disclosed contents of the two documents will be encompassed in their full scope by the disclosure of the present invention, insofar as it is a matter of explaining the present invention.

In the named drilling plates according to the state of the art, the disadvantage exists that the chip breaker groove of the drilling plate bracket can not be optimally designed because the drilling plate has a uniform thickness and/or plate thickness, seen over its axial length.

This leads to the disadvantage that at the foot side (on the contact surface in the bracket), the drilling plate is just as thick as comparatively on the cutting edge (in the front tip area) and that because of the relatively narrow design of the drilling plate, the drilling plate bracket chip breaker groove is not optimally suited for removing the chips.

In fact, it has been found that this type of drilling plate generates so-called flowing chips, which means that during the drilling process the chips do not break off, but are practically infinitely long. Thus the disadvantage exists that the chips wind around the tool and can only be removed with difficulty.

It is not possible to design the plate so that it is significantly thicker and/or with a greater sheet thickness, in order to apply optimum chip breaker grooves and a chip guiding angle on the bracket of the drilling plate: because of this the bracket would be too thin in the area where the plate is fastened and could break during the drilling procedure.

If an attempt is made to make the plate wider the disadvantage exists that the clamping slot width in the bracket will also have to be enlarged accordingly, which is connected with a weakening of the holding tabs, which therefore can no longer secure the plate optimally against torques that occur. Then there is a danger that these holding tabs in the bracket will break.

On the other hand, it is not possible either to make the known drilling plate thinner in order to apply a corresponding chip breaker groove with a chip guiding angle, since this plate then runs conically inward in the direction of its mounting at its base and designed to be so thin that the danger of breaking the plate exists.

SUMMARY OF THE INVENTION

Therefore, the invention is based on the task of further developing a drilling plate of the type named at the beginning that prevents the creation of flowing chips and so that an improved cutting geometry is insured.

A significant characteristic of the invention is that on the front side, two diametrically opposed contact surfaces that are parallel to each other exist which define the base width of the clamping slot in the bracket and that these contact surfaces that are parallel to each other run at an angle and lie opposite the thickness of the cutting edges that enlarge the drilling plate.

Thus the core of the invention is that the drilling plate according to the invention is enlarged over the width of the drilling plate that fits into the clamping slot and contacts there, on the surfaces lying opposite the clamping slot contact surfaces so that enlarged cutting surfaces are formed which now can be designed in an optimum manner with one chip angle and a corresponding chip breaker groove.

Thus in contrast to the state of the art, a drilling plate that is uniformly thick over its entire length is not being described. Rather, according to the invention the drilling plate has a uniform thickness only in the area of the clamping slot and the guide surfaces located there while on the surfaces diametrically opposed to these contact surfaces, the width of the drilling plate (the thickness) is designed so that it is broader in order to have the possibility of applying an optimum cutting geometry in this area for the first time.

To do this, it is provided that corresponding holding tabs diametrically opposed to each other are present in the bracket which between them form the clamping slot in a known way, in which the drilling plate contacts with assigned contact surfaces that are diametrically opposed to each other.

What is now important is that across from these holding tabs, corresponding recess surfaces are provided in the bracket, into which the drilling plate now projects, with expanded cross section which define the cutting geometry.

In this way it is now possible for the first time to insure an optimized cutting geometry because in order to prevent flowing chips, it is provided according to the invention that in the area of the cutting geometry the thickness of the drilling plate is now designed so that it is enlarged in order to apply chip breaker grooves in this area, especially an S-shaped grind of the cutting edges in connection with a chip breaker groove that extends in axial direction.

In addition, clamping the drilling plate in the bracket with two clamping holes having a tapered edge and lying opposite each other is known, which are tensioned with corresponding tapered designed clamping bolts. The clamping is carried out in such a way that when the clamping bolts are tightened, their heads shaped as a cone contact the tapered edge of the respective clamping hole and the drilling plate presses with its base side against the base of the clamping slot.

The object of the present invention now results not only from the object of the individual patent claims, but also from the combination of the individual patent claims with each other.

All the data and characteristics disclosed in the documents including the summary, and in particular the spatial illustration shown in the drawing are claimed as essential to the invention, to the extent that they are novel compared to the state of the art, individually or in combination.

BRIEF DESCRIPTION OF THE DRAWINGS

The present invention will be better understood from the following detailed description of an exemplary embodiment of the invention, taken in conjunction with the accompanying drawings, in which like reference numerals refer to like parts, and in which:

FIG. 1: top view of a drilling plate according to the invention.

FIG. 2: front view of the drilling plate in direction II in FIGS. 1 and 3.

FIG. 3: side view of the drilling plate in direction III in FIGS. 1 and 2.

FIG. 4: side view of a finished drilling tool.

FIG. 5: a view of the bracket according to FIG. 5 turned 90°.

FIG. 6: front view of the arrangement in arrow direction VI in FIG. 4.

FIG. 7: cross section through the drilling plate in the direction of line VII—VII in FIG. 1.

DETAILED DESCRIPTION OF THE DRAWINGS

The drawings illustrate a drilling tool according to an exemplary embodiment of the invention comprising a drilling plate or blade 1 and a holder 7 for holding the drilling blade during a cutting or drilling operation. FIGS. 1 to 3 and 7 of the drawings illustrate the drilling plate or blade 1 and FIGS. 4 to 6 illustrate the blade 1 mounted in holder 7. Blade 1 is of generally rectangular cross section, as can be seen in FIGS. 2 and 7, and is formed of high strength cutting steel or a hard metal. The blade 1 has a base portion 2 which is mounted in a mounting or clamping slot 30 at the forward end of holder 7, and a cutting portion which projects out of the holder 7 as indicated in FIGS. 4 and 5.

The base side of drilling plate 1 is formed by contact surfaces 3 that are interrupted by a middle centering groove 5. Each contact surface 3 can have a small chamfered recess surface 4 in order to achieve better contact on the base of clamping slot 30 in bracket 7 (see FIGS. 4 and 5.)

In addition, a centering pin 6 that is anchored on the base of clamping slot 3 in bracket 7 engages in the centering groove 5.

To fasten drilling plate 1 in bracket 7, corresponding holding tabs 34, 35 that are diametrically opposed to each other are provided in the bracket with associated holes in which clamping bolts 11, 12 engage which penetrate the clamping holes 8, 9.

In a known manner, each clamping hole 8, 9 herein has a surrounding tapered edge 10.

By screwing the clamping bolts 11, 12 in, the entire drilling plate 1 will be prestressed in arrow direction 13 against the base of clamping slot 30 in bracket 7.

The cutting geometry of the cutting head is explained in more detail using FIGS. 2, 3, and 6.

First, according to FIG. 2, a mirror symmetry exists around axis of rotation 39 of drilling plate 1 so that overall the cutting edges 14, 17 that are diametrically opposed to each other are swung in an S-shape. Therefore in the following description it will only be necessary to describe one side of the drilling plate cutting geometry since the diametrically opposed side of the drilling plate is designed in the same way.

In the tip area of drilling plate 1, opposite recesses 15, 16 are provided for chip removal which move the chip generated by cutting edges 14, 17 toward the back in axial direction.

In the area of each recess 15, 16, a curved edge 20 is guided which defines the spherical form of this recess 15, 16.

Rear edges 18, 19 that run straight and parallel to each other are diametrically opposed to the cutting edges 14, 17 and essentially define the width of drilling plate 1 in clamping slot 30.

This width is indicated with 29 in FIG. 2 and is such that the clamping slot 30 can be formed so that it is relatively narrow, which involves the advantages that the diametrically opposed holding tabs 34, 35 can clamp the drilling plate 1 without reduction with high holding force.

It is now important that diametrically opposed to these rear edges 18, 19, the drilling plate 1 according to FIG. 2 has an enlarged width as is shown in FIG. 2 and that the chamfers 21 that define the outer area of the respective cutting edges 14, 17 project beyond the lines defined by edges 18, 19.

Thus a drilling plate 1 with enlarged width according to FIG. 2 is suggested since the width 29 is exceeded by the projecting chamfers 21 that each lie diametrically opposed to each other.

In this way, it is possible for the first time to design the cutting edges 14, 17 with enlarged width, as will be explained in the following.

Guide chamfers 22 connect at approx. a right angle to the outer chamfers 21 and form a reinforcement for the cutting edge so that a very stable cutting edge if formed.

In addition, it is not necessary to form a right angle between chamfer 21 and the guide chamfer 22; this angle can be optionally selected according to the cutting geometry.

Diagonal rear edge 23 connects to guide chamfer 22, this rear edge passing through axis of rotation 39 and which contacts the opposing guide chamfer 22.

Beyond this rear edge 23, recessed surfaces 24 are provided in each axial direction on which the cutting edges are built up.

What is now important is that drilling plate 1 contacts the contact surfaces 25 that are diametrically opposed to each other in clamping slot 30 and designed so that they are relatively narrow, while the widened side surfaces in the area of cutting edges 14, 17 and the chamfers 21, 22 lying opposite each other extend into associated clearances 37 of bracket 7 where they will not impact at any point.

In the area of this clearance 37, the bracket has tool faces 38 that extend in axial direction, whereby the chip breaker grooves 40 on the drilling plate transition into these tool faces 38 in axial direction.

In this way, the cutting edges form an optimum removal for the chips so that these break away and no longer form flowing chips.

Angle 26 (β) shown in FIG. 3 defines the angle of chamfer 21 which is also designated as chip angle.

Angle 27 (γ) in FIG. 2 defines the expansion of cutting edges 14, 17 which leads to an improved cutting geometry according to the invention.

In this case, angle 27 is defined between the line through the rear edge 18, 19 and a straight line which stretches over the respective cutting edge 14, 17.

Angle 28 (α) in FIG. 1 defines the tip angle of the entire drilling plate, i.e. the tip angle of the cutting edges that are designed so that they tilt toward each other.

Also FIG. 5 shows how the contact surface 3 on the drilling plate lies against the slot base 31 in clamping slot 30. A front view from arrow direction VI in FIG. 4 is shown in FIG. 6. FIG. 7 shows a side view through the drilling plate in the center of holes 8, 9 from the illustration in FIG. 1.

In FIG. 5, a clearance 33 is also shown in the area of the front edge of holding tabs 34, 35 which serve for improved chip removal. The chip removal groove 32 is used to remove the chips formed by cutting edges 14, 18 in bracket 7.

Rear edges 18, 19 form contact surfaces 36 on the side walls of the respective holding tabs 34, 35 in the bracket.

What is important in the present invention is thus that a drilling plate is suggested with a cutting geometry that corresponds to that of a drill with enlarged tip without having to deal with the disadvantages of a narrow drilling plate with a correspondingly restricted cutting geometry.

This advantage is achieved in that only the contact surfaces 3 that lie diametrically opposed to each other in bracket 7 are designed so that they are relatively narrow, while the surfaces of drilling plate 1, which lie opposite these contact surfaces and determine the cutting geometry, are designed so that they are relatively wide so that for the first time there is a possibility of designing optimum chip angle and chip breaker grooves in this area without having to significantly reduce the cross section of drilling plate 1.

| Legend for Figures |
| --- |
| 1 drilling plate |
| 2 base element |
| 3 contact surface |
| 4 clearance surface |
| 5 centering groove |
| 6 centering pin |
| 7 bracket |
| 8 clamping hole |
| 9 clamping hole |
| 10 tapered edge |
| 11 clamping bolt |
| 12 clamping bolt |
| 13 arrow direction |
| 14 cutting edge |
| 15 recess |
| 16 recess |
| 17 cutting edge |
| 18 rear edge |
| 19 rear edge |
| 20 curved edge |
| 21 chamfer |
| 22 guide chamfer |
| 23 rear edge |
| 24 clearance surface |
| 25 contact surface |
| 26 angle γ (chip angle) |
| 27 angle |
| 28 angle |
| 29 width |
| 30 clamping slot |
| 31 slot base |
| 32 chip removal groove |
| 33 clearance |
| 34 holding tabs |
| 35 holding tabs |
| 36 contact surface |
| 37 clearance |
| 38 chipping surface |
| 29 axis of rotation |
| 40 chip breaker groove |

What is claimed is:

1. A drilling tool, comprising:
    a holder having a longitudinal axis and a forward end having a clamping slot;
    a drilling blade secured in said clamping slot;
    the drilling blade having a rear end, a forward end, opposite first and second side faces, and opposite end faces, and being of generally rectangular cross section, the blade having a base portion for engagement in said slot at said rear end and a cutting portion projecting out of the slot up to said forward end;
    the cutting portion having first and second, diametrically opposed cutting edges and first and second, diametrically opposed parallel contact surfaces on said opposite side faces at the forward end of said blade, the spacing between said parallel contact surfaces defining a first thickness;
    the blade having an increased thickness greater than said first thickness in the region of the cutting edges; and
    the blade having an arcuate recess in each side face extending up to the respective cutting edge.

2. The tool as claimed in claim 1, wherein the cutting portion has a chip removal recess adjacent each cutting edge for guiding chips generated by the cutting edges in an axial direction towards the rear end of the blade.

3. The tool as claimed in claim 2, wherein each chip removal recess has a curved edge.

4. The tool as claimed in claim 1, wherein each side face of the blade in the cutting portion is a mirror image of the opposite side face, each cutting edge extends outwardly from a generally central region of said forward end of said blade to the respective end face of said cutting portion, the parallel, oppositely directed contact faces defining parallel lines forming a rectangular shape with the opposite end faces of said cutting portion at the forward end of said blade, each cutting edge having an outer area adjacent the respective end face projecting outwardly beyond the line defined by the respective parallel face of said blade.

5. The tool as claimed in claim 4, including a guide chamfer connected to the outer area of each cutting edge and extending approximately towards the respective opposite side face of said cutting potion.

6. The tool as claimed in claim 5, wherein the blade has a central axis of rotation, each guide chamfer having an inner edge, and a diagonal rear edge extends between the respective inner edges of said guide chamfers across the forward end of said blade and through the axis of rotation of said blade.

7. The tool as claimed in claim 1, wherein the cutting edges are swung in a generally S-shape on rotation of the blade.

8. The tool as claimed in claim 1, wherein the clamping slot has a predetermined base width, and the drilling blade in front view has oppositely directed, parallel contact faces defining a blade width substantially equal to said base width of said clamping slot.

9. The tool as claimed in claim 1, wherein the holder has oppositely directed clearances adjacent said clamping slot for receiving the increased width portions of said blade adjacent said forward end.

10. The tool as claimed in claim 6, wherein recessed clearance surfaces extend from said diagonal rear edge up to the respective parallel contact surfaces.

11. The tool as claimed in claim 1, wherein the base portion of said cutting blade which engages in said slot is of uniform thickness.

12. The tool as claimed in claim 1, wherein the holder has a forward end having two forwardly projecting holding tabs, said clamping slot being defined between said holding tabs and said base portion being mounted between said tabs.

13. The tool as claimed in claim 12, wherein the base portion has two clamping holes, the holding tabs having aligned holes which are aligned with said clamping holes, and clamping bolts engage through said holes in said tabs and said clamping holes in said base portion to hold said cutting blade in said holder.

14. The tool as claimed in claim 1, wherein the clamping slot has a base end, a centering pin extends from the base end of said slot, and said base portion of said blade has a rear end having a centering groove, the centering pin engaging in said centering groove.

15. The tool as claimed in claim 9, wherein each clearance has an inner end face, the slot having a chipping face extending axially rearwardly from each clearance end face, the arcuate recess of each cutting edge extending axially rearwardly into said slot facing a respective chipping face, whereby the arcuate recess and opposing chipping face form a chip breaker groove for the chips created by the cutting edges, such that the chips break away and do not form flowing chips.

16. The tool as claimed in claim 12, wherein each holding tab has a forward edge having a clearance for chip removal.

17. The tool as claimed in claim 1, wherein the holder has a chip removal groove for removing chips formed in the holder by the cutting edges of the cutting blade.

18. The tool as claimed in claim 4, wherein the arcuate recess in each side face protrudes outwardly beyond the respective parallel line defining said rectangular shape at the outer edge of the respective cutting edge.

* * * * *